United States Patent Office 3,322,809
Patented May 30, 1967

3,322,809
4-SUBSTITUTED-2,6-TOLYLENE DIISOCYANATE
Gilbert H. Swart, Akron, Ohio, assignor to The General
Tire & Rubber Company, Akron, Ohio, a corporation
of Ohio
No Drawing. Original application Aug. 5, 1959, Ser. No.
831,703, now Patent No. 3,203,931, dated Aug. 31,
1965. Divided and this application Mar. 15, 1963, Ser.
No. 265,359
6 Claims. (Cl. 260—453)

This application is a division of my application Ser. No. 831,703 filed Aug. 5, 1959, and now Patent No. 3,203,931 and a continuation-in-part of my application Ser. No. 664,460 filed June 10, 1957, and now abandoned. The invention relates to novel polyisocyanates, to polyurethane compositions utilizing these polyisocyanates and, more particularly, to polyurethane compositions which are more stable to discoloration on exposure to light, and to methods for making the same.

In the past a great variety of polyisocyanate-polyglycol (or polyester) reaction products have been made which are useful as coatings, foams and elastomers. While such products generally have excellent physical properties, exposure of these polyurethane compositions to light produces a yellowing and darkening of their surface which detracts from their appearance and hence greatly lowers their utility and value.

Attempts to stabilize polyurethane compositions to light have not been too successful. Apparently one of the reasons for discoloration of their surfaces is due to the attack of ultraviolet light on the part of the polymer chain in which the residue of the polyisocyanate molecule itself is present causing it to be changed to a color producing group.

Therefore, it is an object of the present invention to provide a polyurethane composition which is more stable to discoloration by light.

It is another object of the present invention to provide a method for making reaction products of a polyisocyanate and a polyester or polyether useful as coatings, foams and elastomers which have improved light resistant properties.

Still another object is to provide polyisocyanates useful in making polyurethanes more stable against discoloration on exposure to light.

A further object is to provide a method for making polyisocyanates which are useful for reaction with polyethers and/or polyesters to obtain light resistant polyurethanes.

These and other objects and advantages of the present invention will become more apparent to those skilled in the art from the following detailed description and examples.

In accordance with the present invention, it has been discovered that certain substituted organic diisocyanates, when used as starting materials for the production of polyurethanes by reaction with polyols, provide polyurethane compositions such as coatings, foams, elastomers and the like which are more stable to discoloration on exposure to light. These diisocyanates have the general formula:

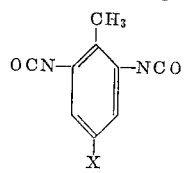

where X is selected from the group consisting of —R, —O—R,

—C≡N, —N(R)₂ and halogen radicals where R is an alkyl radical of from 1 to 5 carbon atoms and where R' is selected from the group consisting of hydrogen and an alkyl radical of from 1 to 5 carbon atoms.

Tolylene diisocyanates which have isocyanate groups substituted for hydrogens at the 2 and 6 positions of the benzene ring and a group such as a tertiary butyl group substituted in the 4 position remarkably inhibit surface darkening of polyurethane products made with such diisocyanate even upon severe exposure to light.

The preferred diisocyanate compounds of the present invention are those in which X of the previously-designated formula contains a branched chain alkyl radical such as an isopropyl or tertiary butyl radical, or a five carbon atom alkyl radical such as a 1,1-dimethyl propyl radical. Examples of preferred compounds are 4-tertiary butyl-2,6-tolylene diisocyanate, 4-isopropyl-2,6-tolylene diisocyanate and 4-isopropoxy-2,6-tolylene diisocyanate.

Still other suitable diisocyanate compounds for use in practice of this invention are 4-ethyl-2,6-tolylene diisocyanate; 4-propyl-2,6-tolylene diisocyanate; 4-pentyl-2,6-tolylene diisocyanate; 4-chloro-2,6-tolylene diisocyanate; 4-bromo-2,6-tolylene diisocyanate; 4-methoxy-2,6-tolylene diisocyanate; 4-ethoxy-2,6-tolylene diisocyanate; 4-cyano-2,6-tolylene diisocyanate; 2,6-diisocyanato-p-tolualdehyde; 4-fluoro-2,6-tolylene diisocyanate; N,N-dimethyl-2,6-diisocyanato-p-toluidine; N,N - dibutyl-2,6-diisocyanato-p-toluidine and the like.

Mixtures of the foregoing 4-substituted tolylene diisocyanates can also be used.

The diisocyanates can be prepared by nitration (with fuming or concentrated sulfuric acid and anhydrous fuming nitric acid) of a 4-substituted toluene, reduction (with an acid halide and a metal) of the nitrated and substituted toluene and then phosgenation of the nitrated product to obtain the desired 4-substituted tolylene-2,6-diisocyanate. The substituent in the 4 or para position must be strongly meta directing or sufficiently bulky to prevent nitration ortho to the 4-substituent. The starting material has the formula:

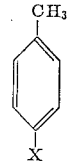

where X is selected from the group consisting of —R, —OR,

—C≡N, —N(R)₂ and halogen radicals, where R is an alkyl radical from 1 to 5 carbon atoms, and where R' is selected from the group consisting of hydrogen and an alkyl radical of from 1 to 5 carbon atoms. Examples of useful starting materials are p-bromotoluene; 4-butoxy toluene; 4-methoxy toluene; p-butyl toluene; p-tertiary butyl toluene; p-chlorotoluene; p-ethyl toluene; p-isopropyl toluene; p-amyl toluene; 4-ethoxy toluene; 4-propoxy toluene; p-fluorotoluene; p-methyl-benzaldehyde; N,N-dibutyl-p-toluidine; N,N-diethyl-p-toluidine; N,N-dimethyl-p-toluidine; p-toluonitrile; p-methyl acetophenone; and the like.

The above described diisocyanate compounds of the present invention also exhibit a decreased reactivity towards active hydrogen containing compounds such as polyesters and polyethers. Thus, in addition to the light stabilizing effects of these 2,6-tolylene diisocyanates they provide a means of better controlling the polyurethane reaction and the processing thereof.

When a clear or white coating or near white appearing surface of a foamed rubber or elastomer is required, the total amount of 4-substituted tolylene diisocyanate used in making the polyurethane should be at least 75% of the chemical equivalents of the total amount of polyisocyanate needed and preferably more of the aromatic diisocyanates of the present invention as previously described should be used. Preferably, at least 90% equivalent of the total amount of organic polyisocyanate used in making the polyurethane should be the particular light inhibiting 4-tolylene substituted diisocyanates of the present invention in order to obtain a pleasant appearing white surface that is not appreciably darkened by exposure to sunlight and the like. The balance of the polyisocyanate equivalent needed to form the polyurethane can be an isocyanate such as tolylene-2,4-diisocyanate;
tolylene-2,6-diisocyanate;
diphenylmethane-p,p'-diisocyanate;
meta-phenylene diisocyanate;
para-phenylene diisocyanate;
naphthalene diisocyanate;
dimethyl diphenyl methane diisocyanate;
bitolylene diisocyanate;
naphthalene triisocyanate;
1-6-hexamethylene diisocyanate and the like and mixtures thereof. Preferably, the additional isocyanate is an aromatic diisocyanate.

As used herein, the term, "polyol," means a substantially aliphatic compound with a long chain molecular structure which has an average molecular weight of at least 500 and terminal hydroxyl groups containing active hydrogen. Examples of polyols are polyesters and polyethers, such as polyethylene adipate and polytetramethylene ether glycol.

The molecular chain of the polyol, which extends between the terminal hydroxyl groups, preferably contains only carbon, hydrogen and oxygen atoms, and preferably has only carbon-to-carbon and carbon-to-oxygen linkages in the chain. While some aliphatically unsaturated linkages may be present, saturated carbon-to-carbon bonds are preferred in the chain since a substantial amount of unsaturated linkages generally reduces age and weather resistance of the polymer.

The term polyester as used herein also includes alkyd resins such as a condensation product of glycerol and phthalic acid. The alkyd resins may be modified by drying oils such as castor oil for use in making polyurethane coating compositions. Polyesters suitable for the use in the present invention may be formed by reacting one or more glycols or bifunctional polyols of the general formula HO—$(RO)_n$—H where $n$ is an integer of from 1 to 50 and R is a hydrocarbon group preferably a divalent aliphatic hydrocarbon or alkylene group (including ethylene, propylene, butylene, isopropylene and isobutylene, etc.) with one or more saturated polycarboxylic acids. Generally, saturated dibasic acids are used such as adipic, glutaric, sebacic, phthalic and terephthalic acids and the like. Suitable glycols are ethylene glycol, diethylene glycol, propylene glycol, polyethylene glycol and polypropylene glycol or mixtures of one or more of these. Glycerol, hexanetriol, pentaerythritol and the like can also be employed alone, mixed together, or mixed with a glycol. The polyesters are preferably formed by reacting a slight excess of glycol over a 1 to 1 molar ratio with a suitable dibasic acid. The mixture is heated and the reaction is stopped when the desired viscosity is obtained. The reaction proceeds with loss of water which is continually removed. Mixtures of polyesters are also useful. Polyesters, also, can be obtained by ester interchange and by other methods.

Examples of suitable polyethers are from the class of polyalkylene ether glycols preferably having an average molecular weight of about 500 up to 3000 or 4000 such as mixed poly(ethylene-propylene) glycols, polyethylene glycol such as "Carbowax" having a molecular weight of about 1000, polytetramethylene ether glycol, polytrimethylene ether glycol, polyneopentylene ether glycol and polypentamethylene ether glycol. Other polyols can be used such as the reaction product of hexanetriol and propylene oxide having a molecular weight of from about 2800 to 3100, 90–95% secondary OH radicals and an OH number of about 56 ("Niaxtriol" LG–56, Union Carbide Corp.); N,N,N',N'-tetrakis(2-hydroxy propyl) ethylene diamine ("Quadrol," Wyandotte Chem. Co.); and the reaction product of sucrose with eight equivalents of propylene oxide to give a compound having 36 carbon atoms and 8 hydroxyl radicals ("Hyprose" SP–80). Mixtures of these polyether polyols can be used.

Mixtures of polyesters and polyethers can be used as well as polyether polyols obtained by reacting a polyalkylene ether glycol and the like with a polyester such as the reaction product of adipic acid and butanediol-1,4. The ester can be either OH or COOH terminated and catalysts can be used to effect the reaction if necessary. The various polyols disclosed herein are preferably OH or essentially OH terminated.

The reaction of an isocyanate group with an active hydrogen of a compound such as a polyester or polyether forms a polymer with recurring linking units of the following general structure:

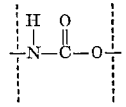

Thus, the urethane polymer has recurring units of the formula:

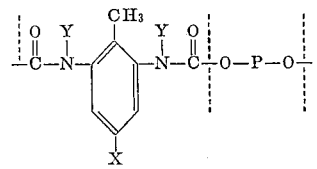

where —O—P—O— is a residue of a hydroxy terminated polyol reacted with an organic diisocyanate of the general formula previously described in which X is selected from the group consisting of —R, —O—R,

—C≡N, —N(R)$_2$ and halogen radicals where R is an alkyl radical of from 1 to 5 carbon atoms and where R' is selected from the group consisting of hydrogen and an alkyl radical of from 1 to 5 carbon atoms. Where a mixture of different "4" substituted 2,6-tolylene diisocyanates is employed, X, of course, will vary in the polymeric chain.

Where excess isocyanate is used or more isocyanate groups are present than needed to react with the OH of the polyols, glycols, water or water vapor, etc., these isocyanate groups will react with the urethane and any substituted urea groups. For example,

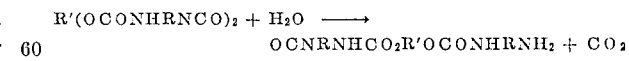

Y, thus, in the foregoing formula can be a hydrogen atom or an isocyanate residue, i.e.,

Mixtures of polyurethanes, also, can be used.

The nature of the active hydrogen containing material used in accordance with this invention is varied greatly depending upon whether the end product desired is a coating, a cellular foamed rubber or an elastomer. For example, the kind of polyester, polyether, or mixtures thereof to be used for foamed polyurethanes depends upon the specific type of foamed product desired. In general, crosslinking type polyesters with high average molecular weights of from about 1500 to 2500 are used for producing flexible polyurethane foam although those with higher average molecular weights such as from 3000 to 3500 or more are also useful. Polyethers, moreover, can be used in place of all or part of the polyesters to obtain light stable polyurethane foams in accordance with this invention.

A typical polyester used for the production of flexible foam products is one that is composed of one mol of adipic acid and one mol of diethylene glycol with about an additional 1/30 mol of trimethylol propane, hexane triol, pentaerythritol etc. which is added to provide for crosslinking during the reaction with the diisocyanates. Generally, the linear polyesters for the flexible polyurethane rubbers are of a lower average molecular weight than 2500 and are closely controlled, although higher molecular weight polyesters may be used. The viscosity of a typical polyester mentioned above is preferably held between about 1000 and 1100 or 1200 cps. at 73° C. The specific gravity of this polyester is generally about 1.19 at 25° C. and it has an OH number of about 60.

A linear polyester with slightly different characteristics is generally used to produce semi-rigid polyurethanes. The average molecular weight of this polyester is also from about 1500 to 2500 and has an OH number of about 60. The viscosity, however, is only from 600 to 800 at about 73° C. and the OH groups are all in the terminal position. The composition of this polyester is one mol of adipic acid and one mol of glycol. This type of polyester may also be blended in varying proportions with the regular rigid polyesters to produce varying degrees of rigidity in the final foamed material.

Polyesters used for the manufacture of rigid cellular polyurethane rubbers are generally of the crosslinking type and preferably have average molecular weights of from 2000 to 3000, although those with molecular weights as high as 4000 may be used. The OH percent is preferably from about 7 to 9, the specific gravity is from about 1.10 to 1.19 and the viscosity is about 2500 cps. at 73° C. One example of this type of polyester is composed of 2½ mols of adipic acid, ½ mol of phthalic anhydride, and 4.2 mols of hexane triol. Another example of a polyester of this type would be one composed of 3 mols of adipic acid, 2.1 mols of hexanetriol, and 2.1 mols of 1,4-butanediol.

The foaming may be produced by rapid stirring preferably in a commercial foam machine by reaction of the diisocyanate with water or a carboxyl group to produce $CO_2$ upon decomposition of the excess diisocyanate. The foamed material can also be produced in a foam machine by gasifying a polyester-diisocyanate at high pressure or by distributing $CO_2$, a "Freon" gas etc. therein during the reaction stage.

In the ordinary method of making cellular polyurethane or foamed polyester diisocyanate reaction product, a viscous, liquid polyester is pumped at a controlled rate through a nozzle. The diisocyanate is pumped at extremely high pressure to the nozzle where it contacts the stream of polyester and is thoroughly mixed therewith because of its high velocity. A small amount of water is also introduced into the nozzle either as a stream or in admixture with the polyester. A suitable catalyst, such as 1,3-propylene glycol or certain tertiary amines or other catalyst, is also preferably mixed with the polyester or introduced into the nozzle. A stirrer, also, is generally present in the nozzle to insure homogeneous mixing. From the nozzle, the material is incorporated into a suitable mold, such as an open pan, which is moved in a continuous manner relative to the nozzle to provide the desired layer of viscous reactants on the bottom of the pan or mold.

Polymerization starts as the materials are mixed and the semi-fluid mass is discharged into large pans. The material mixing is very important. It is essential that the diisocyanate and catalyst be almost immediately and completely dispersed in the polyester. The rate of polymerization is relatively fast and the mass is shaped by the contour of the pans. Carbon dioxide is evolved in the gaseous state from the time of mixing so that the bubbling and frothing occurs during the mixing, discharging and shaping stages.

The foamed materials of the present invention can be formed by first reacting a polyol with a substantial excess of a diisocyanate over a 1:1 molar ratio in the absence of any water to form a dry, partially reacted "prepolymer" so that there are free isocyanate groups present. The "prepolymer" is generally a very viscous and flowable liquid; but if it is a waxy solid at room temperature, it can be made flowable by heating to 100 to 150° F. Subsequently, the dry "prepolymer" is reacted with water, a polyurethane reaction catalyst such as a tertiary amine and preferably a crosslinking agent containing a plurality of labile hydrogens. There is a minimum of agitation employed after the initial dispersion of water in the "prepolymer" to prevent loss of $CO_2$. The amount of water used is generally from about 1 to 3 parts by weight based on 100 parts by weight of prepolymer to provide carbon dioxide for a low density product, although as low as 0.5 part by weight can be used to obtain benefits of this invention. When more than 5 parts of water are used, the urea linkages formed apparently cause a decrease in some of the desirable properties of the foamed material such as resiliency.

As to suitable polyols in making elastomers, in order to make rubbery urethanes, i.e., those which are rubbery at normal temperatures, the molecular weight of the polyesters and of the polyethers prior to reaction with the polyisocyanate is quite important. Also, in order to make rubbery polymers of the solid nonporous type, polyesters having low acid numbers (less than one) are preferred since they give products which are superior, although in accordance with the present invention, polyesters with a much higher acid number, even to the range of an acid number of 60, can be employed. The average molecular weight of the polyesters for the preparation of rubbery polyurethane polymers should be at least about 500 and preferably about 1500 to 2500. The maximum molecular weight of the polyester is dependent only upon the ability to economically make the polyesters of higher molecular weights, the higher molecular weights being preferred. Generally, it is exceedingly difficult to obtain polyesters with an average molecular weight much above 3000 or 4000 without substantially higher costs.

Suitable polymeric compounds for use in making coatings are produced in accordance with the present invention are compounds containing active hydrogens and preferably polyethers or polyesters such as alkyd resins. Suitable oil modified alkyd resins include castor oil modified alkyd resins as resins containing about 40% castor oil and about 60% diethylene glycol phthalate or a castor oil modified resin having an acid number of about 14 and a hydroxyl number of 77.

The molar ratio of total polyisocyanate to polyol is preferably from about 8 to 1 to about 4 to 1 for suitable polyurethane foams, coatings and elastomers although benefits of this invention may be obtained with as low a molar ratio as from about 0.5 to 1 or as high as 10 or 12 total mols of polyisocyanate to 1 mol of polyol.

Generally for coatings, a range of about 1 to 3 moles total polyisocyanate per mole of polyol is used although a range of from about 0.5 to 0.8 up to about 10 to 12 total moles of diisocyanate per mole of polyol can be used.

As to using polyols for polyurethane coatings, the polyisocyanate and the polyol may be mixed in a solvent and spread upon the surface by similar means such as dipping, roller coating, brushing or spraying. Upon heating, the polymerization of the reaction products and evaporation of the solvent are accomplished.

The compositions of the present invention are useful in making crash pads for automobiles, seat cushions, pillows, mattresses, protective coatings for tarpaulins, insulated electric wire coatings, belts, tires, potting compounds and the like. Various compounding materials may be added to the compositions of the present invention such as silicones, silanes, fire resistant pigments, carbon black, $SiO_2$ containing materials, $TiO_2$, color pigments, wood flour, metal flakes, natural and synthetic fibers (such as cotton, rayon, nylon, wool, glass and the like), dyes, fungicides, deodorants, plasticizers, resins, rubbers, emulsifiers (anionic or nonionic), wetting agents, curing agents and the like. Antidegradants including antioxidants and antiozonants can also be added to the present composition such as organic phosphites including the halogenated alkyl and/or aryl phosphites, organic tin compounds and so forth. If a foam is to be made using water and a resin and or rubber are to be added, they can be added in the form of a natural or synthetic rubber and/or resin latex.

The following examples will serve to illustrate the invention with more particularity to those skilled in the art:

EXAMPLE I

The preparation of 4-tert-butyl-2,6-tolylene diisocyanate was carried out as follows:

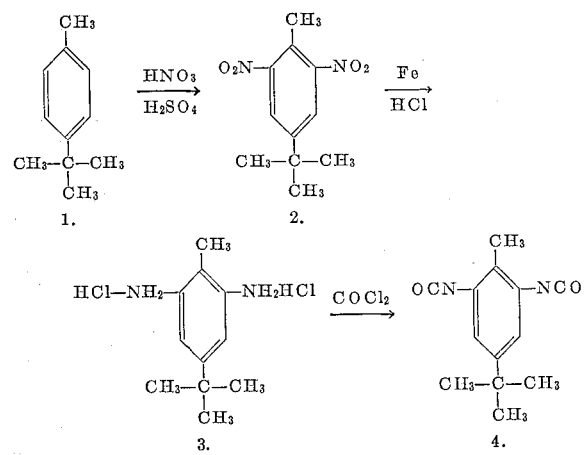

*Nitration of p-tert-butyltoluene, part a.*—One-third of a pound of p-tert-butyltoluene was added dropwise over a period of 1¼ hrs. to a solution of one pound of fuming nitric acid (den. 1.5) and one pound of fuming sulfuric acid (30% $SO_3$) maintaining the temperature at 10 to 15° C. by cooling (Brady and Lahiri, J. Chem. Soc., 1934, 1954, added the nitrating mixture to the cold p-tert-butyltoluene; however, by adding the aromatic compound to the cold nitrating mixture, it was easier to control the temperature). The temperature was raised and maintained at 45 to 55° C. with stirring for three hours (it has also been observed that, following the addition of the p-tert-butyl-toluene, raising the temperature to above 60° C. results in an exothermic reaction accompanied by the evolution of oxides of nitrogen). The organic layer was insoluble in the nitrating mixture. The mix was cooled and poured over one kg. of ice. The greasy solid which precipitated was allowed to leach overnight in the ice-water. It was filtered and slurried with one liter of water and the mix neutralized with sodium bicarbonate. The wet product weighed 300 g. It was dissolved in 1.5 liters of boiling methanol and decolorized with 5 g. of carbon. Cooling to 10° C. gave 134.5 g. (55%) of light yellow platelets of 4-tert-butyl-2,6-dinitro toluene (a sample of 4-tert-butyl-2,6-dinitrotoluene twice recrystallized from methanol, M.P. 94 to 95° C. had a purity greater than 99.9 mole percent from a Smit melting curve determination). Evaporating the filtrate to ½ its volume and cooling gave 19.4 g. of a yellow solid, M.P. 75 to 79° C. When the nitration was repeated, the yield of "2" was increased to 75% by reducing the amount of fuming 90% (dens. 1.5) nitric acid to 1.5 lbs./lb. of hydrocarbon and using 3 lbs. concentrated sulfuric acid/lb. of hydrocarbon instead of fuming sulfuric acid, other conditions remaining constant. Extreme care should be taken during the handling of the fuming sulfuric acid and anhydrous nitric acid. Face shields and rubber gloves should be worn.

*Reduction of 4-tert-butyl-2,6-dinitrotoluene, part b.*—The reduction procedure followed was that given for 2,4-dinitrotoluene in Org. Syn. (Org. Syn. Col., vol. II, p. 160, (1943)). A mixture of 238 g. (1 mole) of 4-tert-butyl-2,6-dinitrotoluene, 400 ml. of 50% ethanol and 340 g. (6 moles) of powdered iron (100 mesh) was heated to reflux and with vigorous stirring 21 ml. of conc. hydrochloric acid in 100 ml. of 50% ethanol was added over a period of one hour. After heating for an additional 3 hours at reflux the mixture was filtered hot, 500 ml. methanol added, and the diamine dihydrochloride isolated by the addition of 366 ml. of conc. hydrochloric acid. The damp crude (brown) product weighed about 700 g. A sample of 461 g. of crude material was slurred with 500 ml. of acetone then filtered and the filter cake washed with 350 ml. of acetone. There was obtained 156 g. (62% theory) of tan, 2,6-diamino-4-tert-butyltoluene dihydrochloride (3). Decomposes above 250° C. When a filter aid and dilution with acetone was used instead of methanol, a yield of 72% of 2,6-diamino-4-tert-butyl-toluene dihydrochloride (3) was obtained.

*Phosgenation of 2,6-diamino-4-tert-butyltoluene dihydrochloride, part c.*—In a 3-liter 3-neck flask fitted with a stirrer, thermometer, gas inlet tube and condenser were placed 1550 ml. of ortho dichlorobenzene and 375 g. (1.5 moles) of 2,6-diamino-4-tert-butyltoluene dihydrochloride. The stirred slurry was heated to boiling and 50 ml. of the dichlorobenzene was distilled to remove a small amount of water present in the solvent. The condenser was changed to reflux and connected to an exit tube and the exit gases washed with 20% sodium hydroxide solution to remove HCl gas and any excess phosgene. Phosgene (345 g.) was passed into the slurry at reflux (180 to 182° C.) for 11 hours until all of the solid disappeared. After cooling, the black solution was filtered, recovering 9 g. of unreacted diamine dihydrochloride. The solvent was removed by distillation, followed by the vacuum distillation of the isocyanate (boiling range 116–118° C./1.0 mm.) to give 230 g. (66% theory) of solid 4-tert-butyl-2,6-tolylene diisocyanate. There remained 87 g. of black resinous pot residue. Redistillation of the diisocyanate gives a solid M.P. 69.5 to 70.0° C. (uncorrected). An infrared spectogram of a carbon tetrachloride solution of the diisocyanate showed a strong absorption at 4.5 (NCO band) and other expected features. The diisocyanate is very soluble in all non-reactive organic solvents, hence purification by recrystallization is impractical.

Phosgenation of two seven mole (1756 g.) batches of 4-tert-butyl-2,6 - diamino - toluene dihydrochloride in 7 liters of technical ortho dichlorobenzene under the above conditions gave crude yields of 75 and 79%. These two batches (98% purity by amine titration) were combined and redistilled to give 5 lbs. of a white material of greater than 99% purity. However, upon standing the compound acquired a dark yellow color. Redistillation of this material (B.P. 105–107° C./0.5 mm.) through a 2 ft. vacuum jacketed column, packed with ³⁄₁₆" diam. single turn glass helices, gave a nearly colorless product analyzing (by amine titration) 100.05 and 98.18% purity.

EXAMPLE II

The method of this example was substantially the same as that of Example I, above, except that the p-tert-butyltoluene was substituted by p-cymene in one instance and by methyl p-tolyl ether in another instance. Relatively high yields of 4-isopropyl-2,6-tolylene diisocyanate and 4-methoxy-2,6-tolylene diisocyanate were obtained.

EXAMPLE III

The method of this example was substantially the same as that of Example I, above, except that the p-tert-butyltoluene was replaced by still other substituted toluenes. The toluenes used, their corresponding diisocyanates and the yields obtained are shown below:

| No. | Starting Material | Product Obtained | Approx. Percent Yield of Meta Isomer (2,6-diisocyanate) |
|---|---|---|---|
| 1 | N,N-dimethyl-p-toluidine. | N,N-dimethyl-2,6-diisocyanato-p-toluidine. | 100 |
| 2 | p-Toluonitrile. | 4-cyano-2,6-tolylene diisocyanate. | 89 |
| 3 | p-Methyl benzaldehyde. | 2,6-diisocyanato-p-tolualdehyde. | 79 |

EXAMPLE IV

A polyurethane coating composition was made by dissolving 3.7 (0.016 mole) parts by weight of 4-tertiary butyl-2,6-tolylene diisocyanate having the formula:

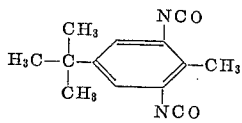

in a solvent of 50 parts of butyl acetate plus 18 parts of xylene. A castor oil modified alkyd resin with a hydroxyl number of 77 and an acid number of 14 was dissolved by stirring 20 parts by weight of the alkyd resin in 50 parts of butyl acetate. The alkyd resin had a molecular weight of about 1250. The molar ratio of polyisocyanate to polyol was about 1 to 1.

The two solutions were separately prepared and then were combined and mixed. After standing for about 30 minutes, the resultant product was coated on the surface of a white plastic polyvinyl chloride article so as to form a light clear film. The coating composition was cured at about 160° C. for about 15 minutes.

A coating composition was prepared as described above except that an equal molar amount of TDI (2,4-toluene diisocyanate) was substituted for the 4-tertiary butyl-2,6-tolylene diisocyanate. Another coating was prepared in which an equal molar amount of MDI-(methylene-bis-4-phenylisocyanate) was used in place of the 4-tertiary butyl-2,6-tolylene diisocyanate.

The above samples were placed in a weathering test apparatus (Atlas Twin Arc Model DL-TS) and evaluated as to light discoloration as described in ASTM test designation: D-822-46T in the May 1954 ASTM Standard on Plastics except that no water spray was used. This test is recognized as a good measure of the resistance of the coating or sample being tested to light embrittlement and discoloration.

The coating samples in which the diisocyanate was TDI and MDI showed a definite yellow to brown discoloration of their white surfaces after only 24 hours of exposure to ultra violet light in this weather-o-meter testing apparatus. However, the coating composition in which the diisocyanate was 4-tertiary butyl-2,6-tolylene diisocyanate exhibited unusual age and weather resistance properties by failing to show any appreciable color change upon an exposure time of 192 hours.

EXAMPLE V

A cellular foamed polyurethane rubber was produced according to the following recipe:

| Ingredients: | Parts by volume |
|---|---|
| Polyester | 100 |
| 2,4-tolylene diisocyanate | 25 |
| Activator | 3 |

The polyester used was the reaction product of 1 mole of adipic acid, one mol of diethylene glycol with about an additional 1/30 mol of trimethylol propane, which is added to provide for crosslinking during the reaction with the diisocyanates. The polyester had a molecular weight of about 2000, a viscosity of from 1000 to 1200 cps. at 73° C., a specific gravity of 1.19 at 25° C. and an OH number of about 60.

The activator included 4 parts by volume of a catalyst (diethylethanolamine adipate), 2 parts of an emulsifier (diethylamineoleate) and about 1.2 parts of water.

The foam was produced in a commercial foam machine and a soft flexible cellular foam product of density of about .065 to .075 gram/cubic centimeter was obtained.

A cellular foamed rubber product was produced as above except that the 2,4-tolylene diisocyanate was substituted by 4-isopropyl-2,6-tolylene diisocyanate, other conditions remaining the same.

Both white foamed polyurethanes were tested for light stability in the Atlas Twin Arc Model DL-TS as previously noted. The first white foamed product showed a surface darkening after 48 hours exposure to ultra violet light while the second polyurethane made with 4-isopropyl-2,6-tolylene diisocyanate showed no substantial surface discoloration nor darkening even after an exposure period of 192 hours.

EXAMPLE VI

An elastomeric polyurethane was prepared from the following amounts of polyester and diisocyanate:

| Ingredient: | Amount |
|---|---|
| Polyester (ethylene 67% by weight, propylene 33%, adipate; molecular weight about 2,000 and acid number under 1) | 1 mol |
| Diisocyanate (naphthalene - 1,5 - diisocyanate) | 1 mol |

The diisocyanate and polyester were mixed together and allowed to polymerize at a temperature of about 115° C. for a minimum time of 2 hours. Polymerization at room temperature required a much longer time.

The polymer was then compounded and milled with a white pigment, calcium carbonate, and a suitable curing agent and thereafter cured with about 30 to 60 pounds steam pressure for from 10 to 120 minutes.

EXAMPLE VII

A polyurethane elastomer was prepared as in Example VI except that the diisocyanate was replaced by 4-methoxy-2,6-tolylene diisocyanate.

When the elastomers of Examples VI and VII were tested for ultra light resistance, the rubbery polyurethane of Example VII had unusually good light stability showing no substantial surface darkening or discoloration even after 192 hours exposure; whereas, the first elastomer (Example VI, above) exhibited definite surface darkening after only 48 hours exposure.

While 4-tertiary butyl-2,6-tolylene diisocyanate provides the best inhibiting action to surface darkening, any diisocyanate, of the general formula as previously described, with an inhibiting group in the 4 position will produce unusual light resistance in polyurethane compositions used for coatings, foams and elastomers.

It is to be understood that, in accordance with the provisions of the patent statutes, the particular form of compound and product shown and described and the particular procedure set forth are presented for purposes of explanation and illustration and that various modifications of said product, compound and procedure can be made without departing from this invention.

Having thus described the invention, what is claimed is:
1. An aromatic diisocyanate having the formula:

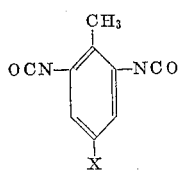

where X is an alkyl radical of from 3 to 5 carbon atoms,
—O—R,

—C≡N, —N(R)$_2$ or a halogen radical, where R is an alkyl radical of from 1 to 5 carbon atoms and where R' is hydrogen or an alkyl radical of from 1 to 5 carbon atoms.
2. 4-isopropyl-2,6-tolylene diisocyanate.
3. 4-methoxy-2,6-tolylene diisocyanate.
4. N,N-dimethyl-2,6-diisocyanato-p-toluidine.
5. 4-cyano-2,6-tolylene diisocyanate.
6. 2,6-diisocyanato-4-tertiary butyltoluene.

References Cited

UNITED STATES PATENTS

| 2,300,757 | 2/1944 | Kaase et al. | 260—453 |
| 2,468,713 | 4/1949 | Kropa et al. | 260—453 X |
| 2,680,129 | 6/1954 | Flores | 260—453 |

OTHER REFERENCES

Carpenter et al., The Journal of Organic Chemistry, vol. 19, No. 1 (1954), pp. 89 and 96.

Noller, Chemistry of Organic Compounds, W. B. Saunders Co., Philadelphia (1965), page 475.

Siefken, Annalen der Chemie, vol. 562 (1949), page 127.

Taylor et al. Chemical Society Journal (1952), pp. 1123 to 1127.

CHARLES B. PARKER, *Primary Examiner.*

J. P. BRUST, R. L. RAYMOND, *Examiners.*